United States Patent
Faruque et al.

(10) Patent No.: US 9,751,395 B2
(45) Date of Patent: Sep. 5, 2017

(54) METHODS AND SYSTEMS FOR A DETACHABLE FUEL PIPE OF A VEHICLE FUELING SYSTEM

(71) Applicant: Ford Global Technologies, LLC, Dearborn, MI (US)

(72) Inventors: Mohammed Omar Faruque, Ann Arbor, MI (US); Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 14/724,483

(22) Filed: May 28, 2015

(65) Prior Publication Data
US 2016/0347169 A1 Dec. 1, 2016

(51) Int. Cl.
| | |
|---|---|
| *B60K 15/01* | (2006.01) |
| *B60K 15/03* | (2006.01) |
| *B60K 15/04* | (2006.01) |
| *F16L 55/10* | (2006.01) |

(52) U.S. Cl.
CPC .............. *B60K 15/01* (2013.01); *B60K 15/03* (2013.01); *B60K 15/04* (2013.01); *B60K 2015/0319* (2013.01); *B60K 2015/0321* (2013.01); *B60K 2015/03328* (2013.01); *B60K 2015/03375* (2013.01); *B60Y 2306/01* (2013.01); *B60Y 2400/40* (2013.01); *B60Y 2400/404* (2013.01); *F16L 55/1007* (2013.01)

(58) Field of Classification Search
CPC .......................... B60K 28/14; F02M 21/0293
USPC ........................................... 180/284; 123/529
See application file for complete search history.

(56) References Cited

U.S. PATENT DOCUMENTS

| | | | |
|---|---|---|---|
| 3,511,515 A | 5/1970 | Cline et al. | |
| 4,195,897 A * | 4/1980 | Plevjak | H01H 35/14 180/283 |
| 4,323,094 A * | 4/1982 | Paulis | B64D 37/16 137/614.03 |
| 4,899,786 A | 2/1990 | Morris et al. | |
| 4,989,638 A * | 2/1991 | Tervo | F16L 37/30 137/614 |
| 5,054,528 A * | 10/1991 | Saitoh | B60K 15/03519 137/587 |

(Continued)

FOREIGN PATENT DOCUMENTS

| | | | | |
|---|---|---|---|---|
| DE | 3840912 A1 * | 6/1989 | ............ | B60K 15/077 |
| GB | 2254125 A * | 9/1992 | ..... | B60K 15/003519 |

OTHER PUBLICATIONS

PPape, Erwin, Fuel supply for a motor vehicle internal combustion engine with a safety device in the event of a crash, Jun. 29, 1989, German Patent Office, DE 38 40 912 A1, Machine Translation of Description.*

*Primary Examiner* — James A English
(74) *Attorney, Agent, or Firm* — James Dottavio McCoy Russell LLP

(57) ABSTRACT

Methods and systems are provided for a detachable fuel pipe of a vehicle fuel system. In one example, a method may include, in response to a detected vehicle collision, removing physical and fluidic couplings between the detachable fuel pipe and a fuel tank. The method may further include sealing the fuel tank upon removing the couplings to the detachable fuel pipe.

20 Claims, 7 Drawing Sheets

(56) References Cited

U.S. PATENT DOCUMENTS

| | | | | |
|---|---|---|---|---|
| 5,176,162 | A * | 1/1993 | Jones | B67D 7/3218 |
| | | | | 137/533.25 |
| 5,568,828 | A * | 10/1996 | Harris | B60K 15/04 |
| | | | | 137/514.5 |
| 5,570,719 | A * | 11/1996 | Richards | F16L 37/148 |
| | | | | 137/614.04 |
| 5,706,967 | A * | 1/1998 | Weh | B60K 15/03006 |
| | | | | 220/203.01 |
| 6,354,261 | B1 | 3/2002 | Lassiter | |
| 6,357,493 | B1 * | 3/2002 | Shermer | B67D 7/0486 |
| | | | | 141/59 |
| 7,086,493 | B2 | 8/2006 | Knight | |
| 7,363,997 | B2 | 4/2008 | Sato et al. | |
| 7,521,817 | B2 * | 4/2009 | Gors | B60R 21/0132 |
| | | | | 169/54 |
| 7,841,440 | B2 | 11/2010 | Liu | |
| 2005/0236213 | A1 * | 10/2005 | Hosoya | B60R 21/013 |
| | | | | 180/284 |
| 2007/0012363 | A1 * | 1/2007 | Inoue | B60K 15/013 |
| | | | | 137/351 |
| 2007/0026711 | A1 * | 2/2007 | Chorian | B60K 28/14 |
| | | | | 439/174 |
| 2007/0129902 | A1 | 6/2007 | Orbell | |

\* cited by examiner

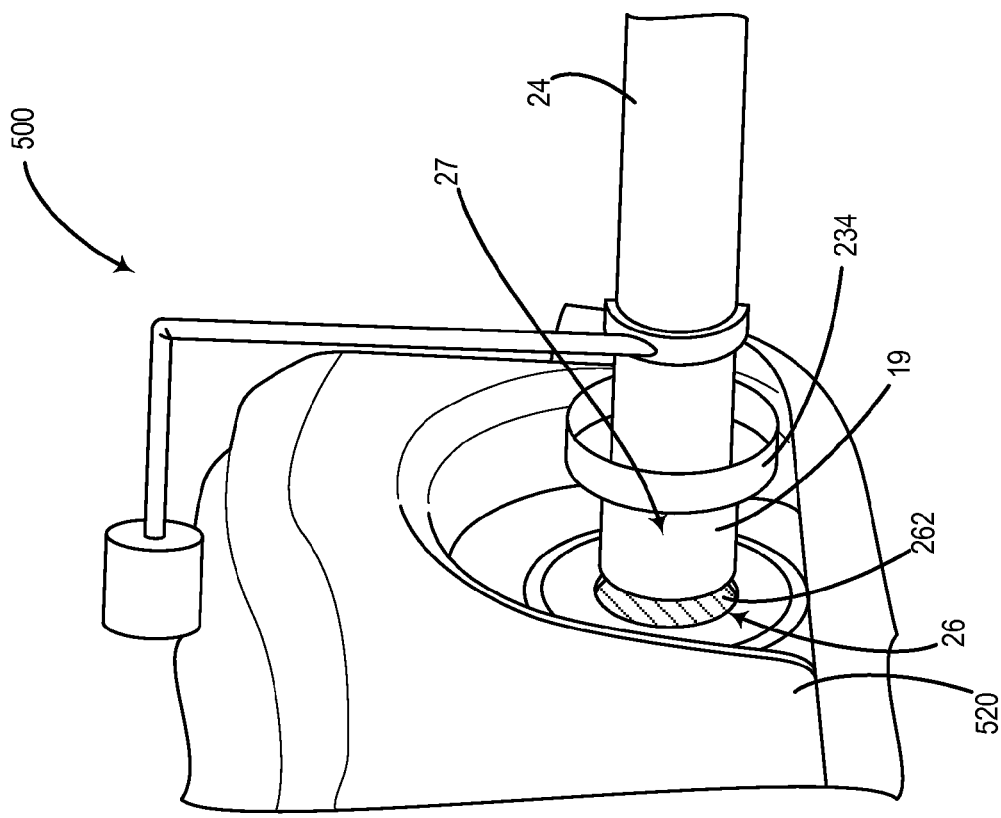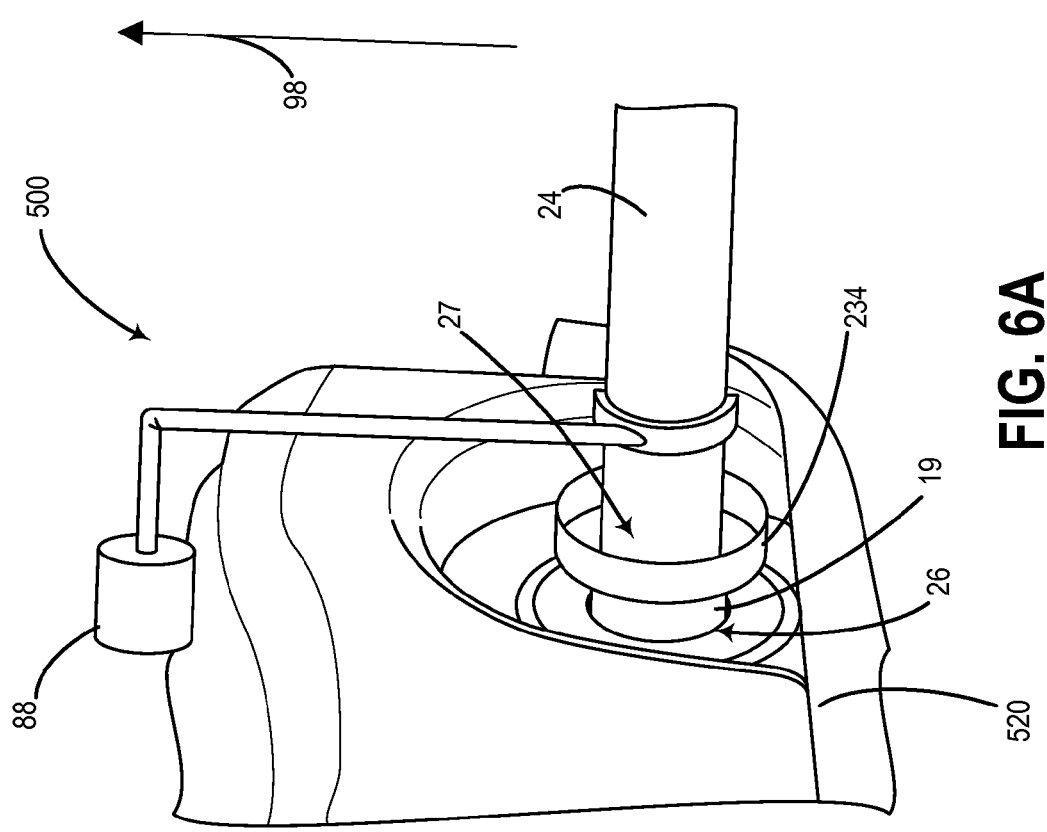

METHODS AND SYSTEMS FOR A DETACHABLE FUEL PIPE OF A VEHICLE FUELING SYSTEM

FIELD

The present description relates generally to methods and systems for controlling a vehicle to disengage a fuel tank from a fuel pipe in the event of a vehicle impact.

BACKGROUND/SUMMARY

Internal combustion engines operate by converting chemical energy stored within combustible fuels to mechanical energy. When an internal combustion engine is employed in a vehicle, the mechanical energy is typically converted to torque for impelling rotational motion in the wheels of the vehicle. Vehicles often include a fuel system configured to provide desired amounts of fuel to combustion chambers of the engine at precise times. In one example, such fuel systems include a fuel supply tank for storing fuel, a fuel line coupling the fuel tank to the engine, a fuel pump situated on said fuel line for delivering fuel from the fuel tank to the engine at a desired pressure, and a fuel pipe for supplying additional fuel to the fuel tank. A fuel pipe includes a first end connected to a fuel tank port of the fuel tank and a second end connected to a vehicle fueling port that is typically located at an exterior side wall of the vehicle. Because of the volatile nature of fuel, breaches at any location in the fuel system may allow fuel vapor to escape to the atmosphere.

Even a well-sealed fuel system may experience fuel leakage or spillage in the event of a high-impact vehicle collision. Attempts to address fuel system breaches due to vehicle collisions include blocking fluidic communication between the fuel tank and the engine via a valve in response to extreme impacts. One example approach is shown by Lassiter in U.S. Pat. No. 6,354,261. Therein, a solenoid valve is held in an energized position during engine operation via an impact-sensitive switch. Upon high impacts, the impact-sensitive switch is dislocated from a first position to a second position, and in response the solenoid valve moves from an energized position to a de-energized position. In the de-energized position, the solenoid valve prevents the passage of fuel between the fuel tank and the fuel pump. In this way, fuel is not supplied to the fuel pump if a high impact may have created a fuel system breach near the engine, thereby reducing the chance fuel escaping from the vehicle fuel system.

However, the inventors herein have recognized potential issues with such systems. As one example, blocking fluid communication between the fuel tank and the engine may not reduce leakage via other ports on the fuel tank. For example, if the fuel pipe coupling the vehicle fueling port to the fuel tank is ruptured, for example via a side-on collision, fuel may leak from the fuel tank through the rupture in the fuel pipe (e.g., as fuel vapor).

In one example, the issues described above may be addressed by a system for a vehicle, comprising a side fueling port fluidly and physically coupled to a fuel tank via a fuel pipe including a detachable nozzle, and a controller with computer-readable instructions stored thereon for disengaging the nozzle from the fuel tank in response to receiving a signal from an impact sensor indicating a vehicle side impact. In this way, fuel leakage through a fuel pipe that has been degraded via a collision may be reduced.

As one example, a fuel pipe nozzle of a fuel pipe coupling a vehicle fueling (e.g., re-filling) port to a fuel tank of an engine fuel system may be engaged in a self-sealing fuel tank port of the fuel tank. An actuator may be configured to effect translational motion of the nozzle along the interfacial axis of the self-sealing fuel tank port and the fuel pipe nozzle. In response to a detected impact event, a vehicle controller may control the actuator to translate the nozzle from an engaged position to a disengaged position. The engaged position may include a physical and fluidic coupling between the fuel tank port and the vehicle fueling port, and the disengaged position may include neither a physical coupling nor a fluidic coupling between the fuel tank port and the vehicle fueling port. Moving the side fueling port from an engaged position to a spaced-apart disengaged position may include retracting the nozzle from the fuel tank coupling by a small predetermined distance, thereby removing the physical and fluidic couplings between the fuel tank and fuel pipe, and allowing the fuel tank port to move to a closed position via a self-sealing mechanism. In this way, the fuel tank may be quickly sealed from the side fueling port in the event of a high impact collision.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6A shows the second embodiment of the detachable fuel pipe system in an engaged condition.

FIG. 6B shows the second embodiment of the detachable fuel pipe system in a disengaged condition.

DETAILED DESCRIPTION

Figure 2:
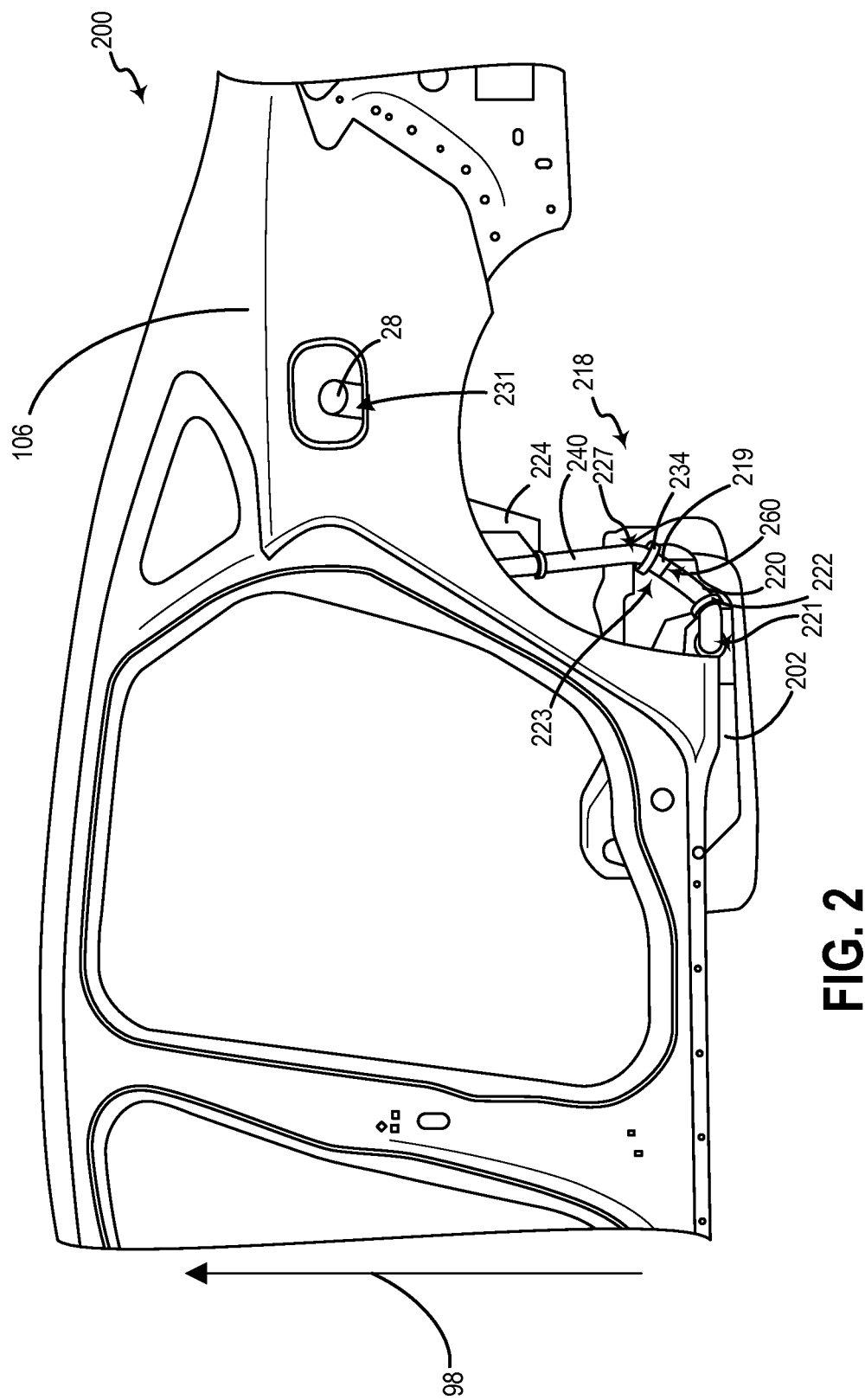
FIG. 2 provides a structural view of a fuel tank and a fuel pipe in relation to an exterior body of a vehicle.
Figure 3:
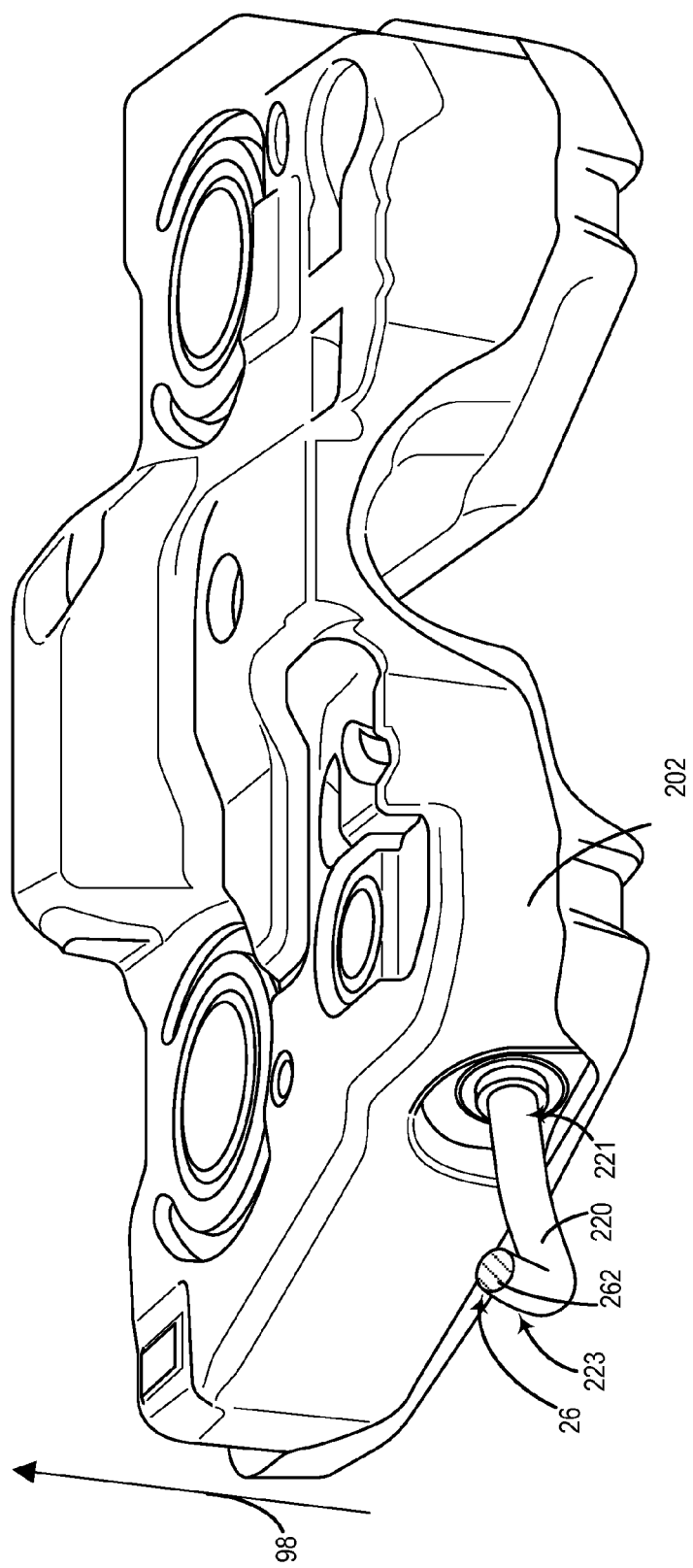
FIG. 3 shows a self-sealing extension pipe of a first embodiment of a detachable fuel pipe system.
Figure 4B:
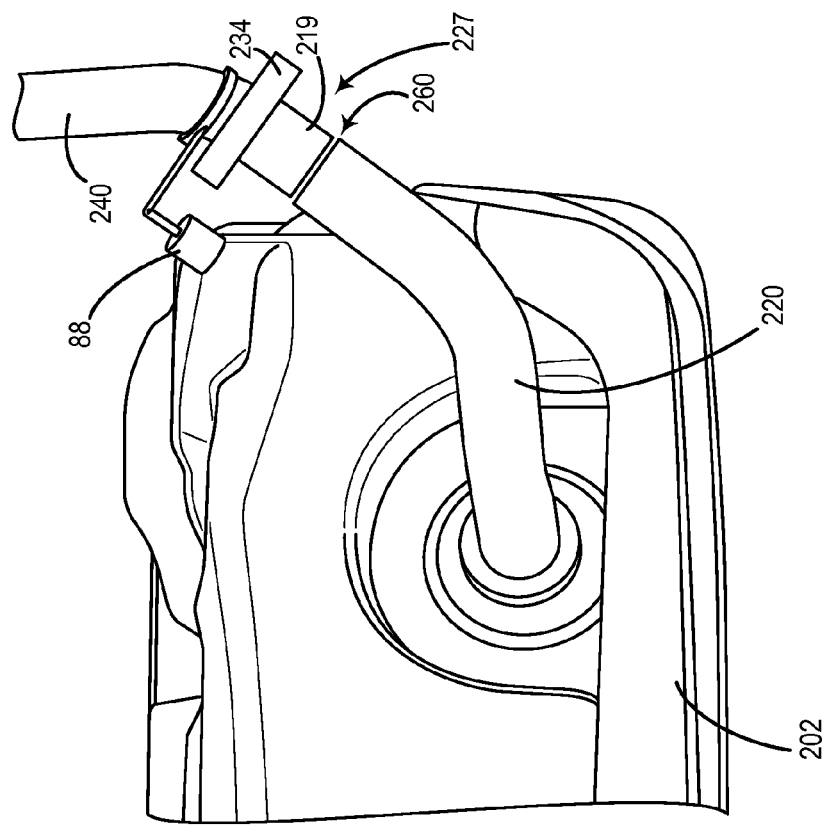
FIG. 4B shows the first embodiment of the detachable fuel pipe system in a disengaged condition.
Figure 4A:
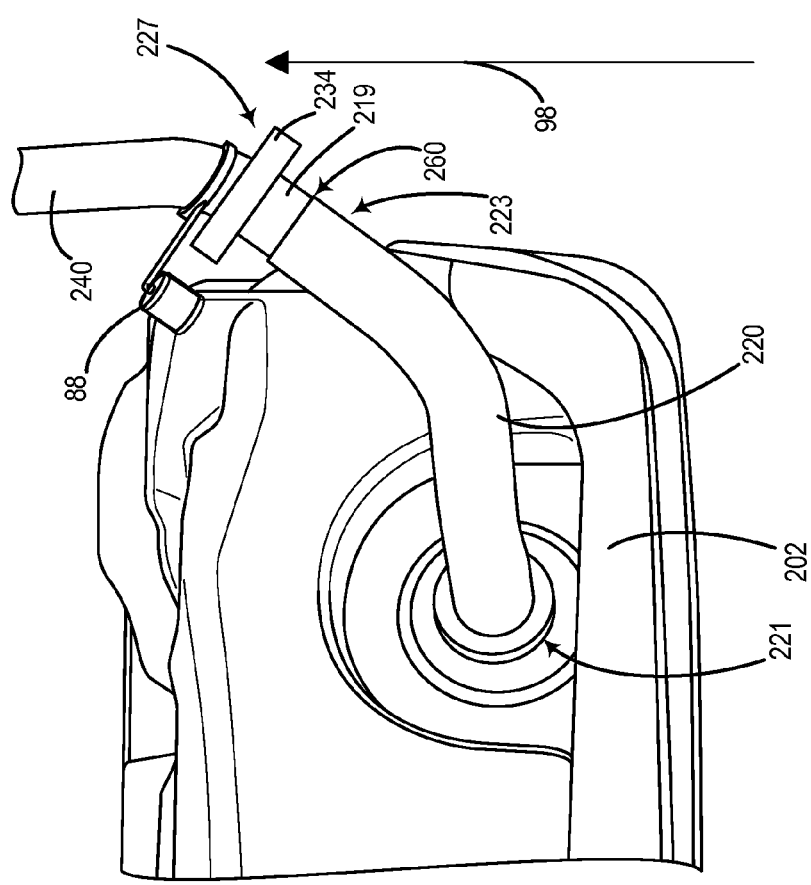
FIG. 4A shows the first embodiment of the detachable fuel pipe system in an engaged condition.
Figure 5:
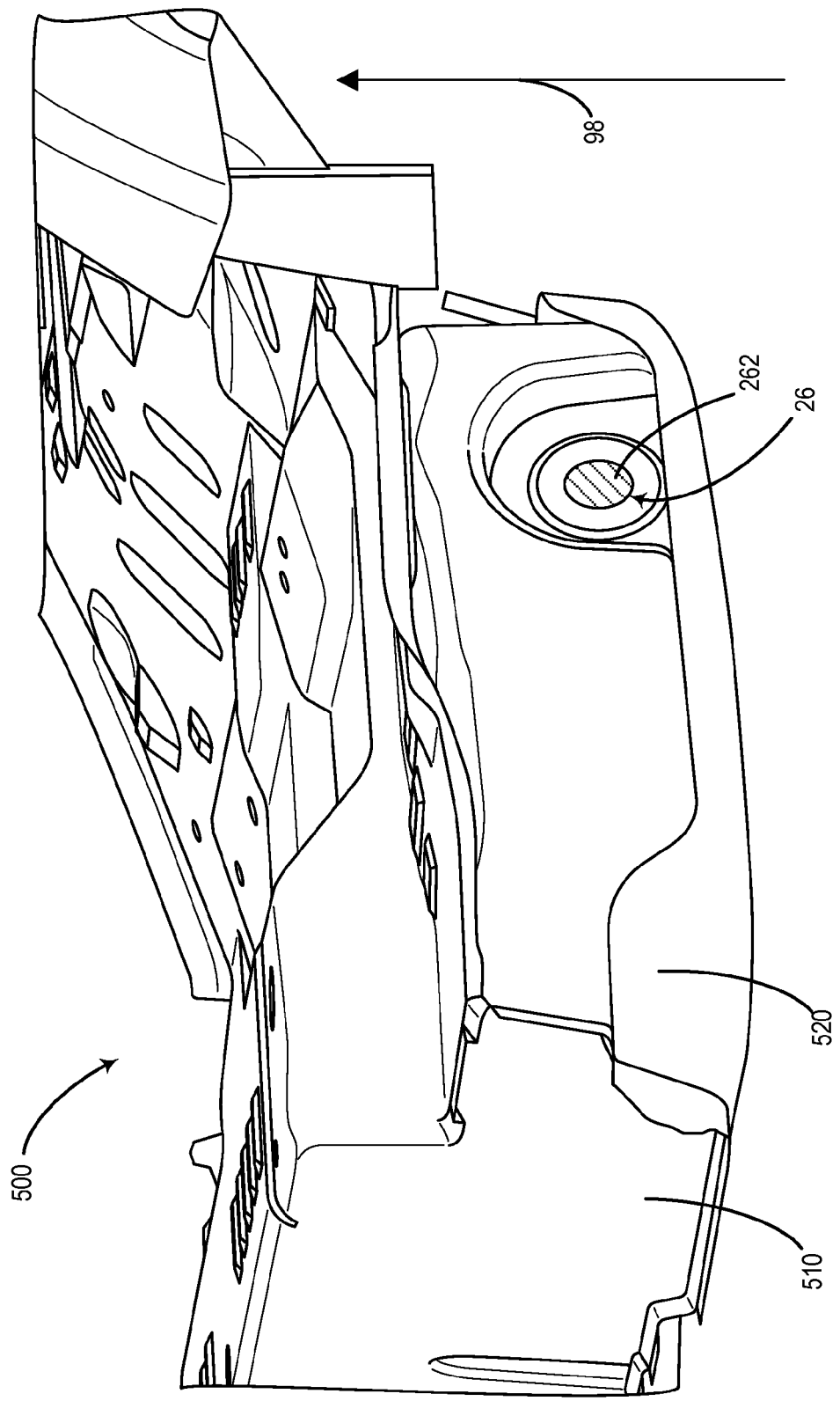
FIG. 5 shows a self-sealing fuel tank port of a second embodiment of a detachable fuel pipe system.

The following description relates to systems and methods for disengaging a fuel pipe from a fuel tank of a vehicle in the event of a side impact event of the vehicle. An example fuel system for the vehicle, such as the system shown in FIG. 1, includes a fuel pipe that is detachable from a fuel tank via a detachable nozzle. A position of the fuel pipe between a vehicle fueling port (e.g., where a user may re-fill fuel of the vehicle) and the fuel tank is shown in FIG. 2. The nozzle of the fuel pipe may be configured to couple with an inlet port of the fuel tank. FIG. 3 shows a first embodiment of a fuel tank of a vehicle fueling system including a fuel tank extension pipe directly coupled to the fuel tank at a first end of the fuel tank extension pipe. A second end of the fuel tank extension pipe includes an inlet port adapted to be coupled to the nozzle of the fuel pipe. FIG. 5 shows a second embodiment of a fuel tank including a fuel tank inlet port adapted to be coupled to the nozzle of the fuel pipe that is integral to the body of the fuel tank. The fuel pipe nozzle may be adjusted into an engaged position or a disengaged position with either the inlet port of the fuel tank or the fuel extension pipe, via an actuator. It will be appreciated that the mechanism of engaging and disengaging the fuel pipe nozzle with the fuel tank inlet port may not differ between embodiments. FIGS. 4A and 4B illustrate the respective engaged and disengaged positions of the detachable fuel pipe nozzle within the first embodiment, while FIGS. 6A and 6B illustrate the respective positions of the detachable fuel pipe nozzle within the second embodiment. A method for operating the fuel system of the present invention is provided at FIG. 7, and includes disengaging the fuel pipe from the fuel tank in response to an impact event. In this way, fuel leakage due to fuel pipe degradation during side impact events may be reduced.

Figure 1:
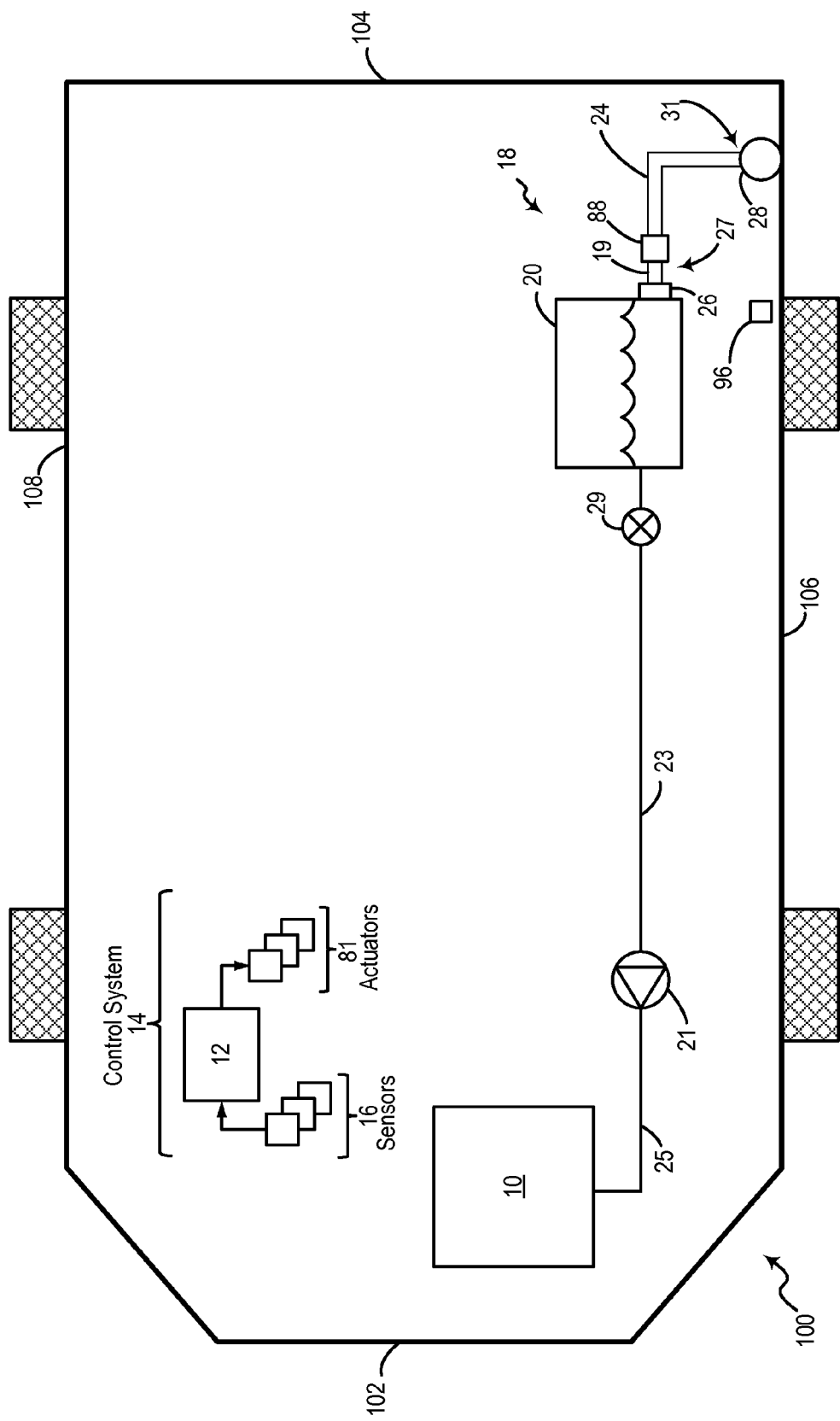
FIG. 1 provides a schematic view of a fuel system within a vehicle.

Turning now to FIG. 1, it shows a vehicle 100 including an engine 10 and a fuel system (indicated generally at 18) with a detachable fuel pipe 24. The exterior body of vehicle 100 includes a front end 102, a rear end 104, a first side 106, and a second side 108. It will be understood that the front end 102 of vehicle 100 is the end that is facing in the direction of travel when the vehicle is in drive. Similarly, rear end 104 will be understood to be the end of the vehicle body facing in the direction of travel when the vehicle is in a reverse drive mode. First and second sides 106 and 108 face in perpendicular directions to the forward and backward motion of the car.

Engine 10 may inject fuel received from fuel system 18 into one or more combustion chambers to impel motion in vehicle system 100. One or more of a plurality of injector configurations may be implemented such as one or more of direct fuel injection, port fuel injection. Furthermore, engine 10 may be one of a plurality of motors in a vehicle drive train, for example it may be included along with an electric motor in a hybrid electric vehicle.

Fuel system 18 may include a fuel tank 20 coupled to a fuel pump system 21 via a fuel pump inlet line 23. Fuel pump inlet line 23 begins at fuel tank 20 and ends at fuel pump system 21. In some examples, fuel pump inlet line 23 may include a valve 29 for selectively blocking the fluidic communication between fuel tank 20 and fuel pump system 21, as described in further detail below. Valve 29 is located downstream of fuel tank 20 and upstream of fuel pump system 21. Valve 29 may be a solenoid valve, for example. Fuel pump system 21 may be coupled to engine 10 via fuel pump outlet line 25. Fuel pump outlet line 25 begins at fuel pump system 21 and ends at engine 10, shown in the present example with no intervening components. Thus, fuel tank 20 is configured to deliver fuel to engine 10 via sequential components, fuel pump inlet line 23, fuel pump system 21, and fuel pump outlet line 25 of fuel system 18.

Fuel tank 20 may hold a plurality of fuel blends, including fuel with a range of alcohol concentrations, such as various gasoline-ethanol blends, including E10, E85, gasoline, etc., and combinations thereof. Fuel pump system 21 may include one or more pumps for pressurizing fuel delivered to the injectors of engine 10. It will be appreciated that fuel system 18 may be a return-less fuel system, a return fuel system, or various other types of fuel system.

Fuel tank 20 may receive fuel via fuel tank inlet port 26. Fuel tank inlet port 26 may be a cap-less or self-sealing fueling port that is configured to seal when not engaged by a fuel pipe, as described in further detail below. In some examples, fuel tank inlet port 26 may be located at a first end of a fuel tank extension pipe (as shown in FIG. 3, described further below) that is directly coupled to fuel tank 20 at a second end of the extension pipe. As shown in FIG. 1, the fuel tank inlet port 26 is integral to the fuel tank housing. Fuel tank inlet port 26 may be coupled to side fueling port 28 via fuel pipe 24. Specifically, fuel pipe 24 may physically and fluidically couple side fueling port 28 to fuel tank 20 at inlet port 26 of the fuel tank. It will be appreciated that fuel pipe 24 is external to fuel tank 20 in all fuel pipe systems contemplated herein. Side fueling port 28 may be attached to the body of the vehicle at one of first side 106 or second side 108. In an alternate example, side fueling port 28 may be attached to another one of the vehicle body's faces, such as rear end 104.

Fuel pipe 24 includes a first end 27 that is selectively physically coupled to fuel tank inlet port 26 and a second end 31 that is physically coupled to side fueling port 28. Specifically, the first end 27 of fuel pipe 24 includes a retractable nozzle 19 that is actuated by an actuator 88. Nozzle 19 has an opening for delivering fuel introduced to fuel pipe 24 to fuel tank 20 when the nozzle is engaged with fuel tank inlet port 26. In one example, actuator 88 is a solenoid clip configured to control a position of nozzle 19. It will be appreciated that in other examples, a different means of actuation may be used to engage and disengage the first end 27 of fuel pipe 24 while remaining within the scope of this disclosure. Though not depicted in the present figure, the first end 27 of the fuel pipe 24 may include a shroud (e.g., as shown in FIG. 2, described further below) for protecting the interface of the fuel pipe and the fuel tank from dirt accumulation. As one example, the shroud may be manufactured from rubber or plastic. In this way, each of fuel contamination and nozzle degradation may be reduced.

In a first position, nozzle 19 may adapted to be engaged with inlet port 26 of the fuel tank 20, thereby coupling fuel pipe 24 to fuel tank 20. In this way, when the first end 27 of fuel pipe 24 is physically coupled to fuel tank inlet port 26, side fueling port 28 is fluidically and physically coupled to fuel tank 20. Actuator 88 may also disengage nozzle 19 from inlet port 26 of the fuel tank 20 by adjusting the position of the nozzle from the first position to a second, disengaged position. The disengaged position includes the nozzle 19 spaced apart from fuel tank inlet port 26. When nozzle 19 is actuated from an engaged position to a disengaged position, each of the fluidic and physical coupling of side fueling port 28 and fuel tank 20 are disconnected. In this way, the nozzle 19 is removably coupled to the inlet port 26 and the actuator 88 may disengage (e.g., uncouple) the nozzle 19 from the inlet port 26. As such, by detaching the nozzle 19 from the inlet port 26, the fuel pipe 24 is physically and fluidly uncoupled from the fuel tank 20.

In some examples of fuel system 18, fuel vapors generated in fuel tank 20 may be routed to a fuel vapor canister before being purged to the engine air intake. The fuel vapor canister may be filled with an appropriate adsorbent, for temporarily trapping fuel vapors (including vaporized hydrocarbons) generated during fuel tank refueling operations, as well as diurnal vapors. In one example, the adsorbent used is activated charcoal. When the canister is saturated, vapors stored in fuel vapor canister may be purged to an air intake conduit of engine 10. However, it will be appreciated that the advantages of the present invention may be achieved in vehicle systems and fuel systems without a fuel vapor canister.

Vehicle system 100 includes impact sensor 96, which may be advantageously used to detect high-impact vehicle collisions. Specifically, when mounted to the vehicle body, impact sensor 96 may be configured to detect magnitudes of force over a threshold level applied to the car within a predetermined adjacent area of the vehicle body. As shown, impact sensor 96 is mounted to the vehicle on the same face of the vehicle body as fueling port 28, for reasons described below.

Impact sensor 96 may be configured to detect the magnitude of force applied to the vehicle along a given axis, or alternatively may be configured to detect the magnitude of forces applied to the car in all directions. In some examples, impact sensor 96 may only detect forces above a threshold magnitude, for instance if it is implemented as a rolling plunger device depressed by an external object in a resting state. In this example, the impact sensor may be designed so that a threshold dislodging force correlates to a high-impact collision. In other examples, the impact sensor may be an accelerometer and may calculate forces based on said acceleration and predetermined mass parameters via controller 12 or an integrated sensor computer. In such an example, the sensor may indicate a high-impact collision when the calculated force is above a specified threshold.

One or more components of vehicle fuel system 18 may be degraded upon impacts over a threshold magnitude, thereby introducing a breach in the fuel system. As one example, a fuel conduit such as fuel pump inlet line 23 or fuel pipe 24 may rupture or otherwise experience degradation upon an impact over a threshold magnitude. Vehicle 100 includes a plurality of features for reducing the leakage of fuel through a breach in the fuel system. In other examples, a vehicle may include one or more of the described features for reducing fuel leakage.

By way of impact sensor 96, vehicle system 100 may further include a means to reduce the delivery of fuel to the engine compartment in response to a high-impact collision (e.g., a collision over a threshold magnitude). For instance, in response to a sensing an impact over a threshold, valve 29 may be adjusted from an open position to a closed position to stop (e.g., cut off) fluidic communication between fuel tank 20 and each of fuel pump system 21 and engine 10. Thus, the delivery of fuel from fuel tank 20 to downstream components of the fuel system may be reduced. In this way, if an engine component or a fuel system component is degraded downstream of the fuel tank 20, fuel leakage through the degraded fuel system component may be reduced. However, while closing valve 29 may reduce fuel leakage through a fuel system breach downstream of valve 29, this action alone may not reduce fuel leakage due to degradation of other fluid connections or components of the fuel system. For example, closing valve 29 does not stop or reduce fuel leakage due to degradation of the fuel pipe 24 or the fluidic connection between the fuel pipe 24 and fuel tank 20 during an impact event.

As described in further detail below, impact sensor 96 may be advantageously used in combination with actuator 88 for disengaging nozzle 19 from fuel tank inlet port 26. Specifically, when a collision event (e.g., impact over a threshold magnitude) is detected by impact sensor 96, actuator 88 may be controlled to retract nozzle 19 out of and away from fuel tank inlet port 26. Fuel tank inlet port 26 may then self-seal via a self-sealing mechanism, thereby removing the fluidic and physical couplings between side fueling port 28 and fuel tank 20. In this way, leakage of fuel from fuel tank toward the site of a side-on collision may be reduced.

Vehicle system 100 further includes control system 14. Control system 14 is shown receiving information from a plurality of sensors 16 (various examples of which are described herein) and sending control signals to a plurality of actuators 81 (various examples of which are described herein). As one example, sensors 16 may include impact sensor 96 located on the same side of the vehicle as side fueling port 28. Other sensors such as additional pressure, temperature, air/fuel ratio, and composition sensors may be coupled to various locations in the vehicle system 100. As another example, the actuators may include a fuel injector, valve 29, and actuator 88. The control system 14 includes a controller 12. The controller receives signals and input data from the various sensors, process the input data, and employs the various actuators of FIG. 1 to adjust engine operation based on the received signals, processed input data, and instructions stored on a memory of the controller. Example control routines executed by the controller are described herein with regard to FIG. 7. As an example, the controller may include computer-readable instructions stored thereon for disengaging the nozzle 19 from the fuel tank 20 in response to receiving a signal from an impact sensor 96 indicating a vehicle side impact, said disengaging actuated by actuator 88.

Note that a side impact may include an impact with a lateral force and/or acceleration direction with respect to a forward direction of vehicle travel (e.g., to the left in FIG. 1). In one example, the actions of disconnecting one or more components of the fuel system from each other (e.g., the filler neck disconnected from the tank) are taken only in response to receiving a signal indicating a vehicle side impact direction. A side impact may include lateral accelerations or a lateral acceleration components greater than a non-zero threshold level. In one example, the action of disconnecting one or more fuel system components from each other is not taken in response to indications of impacts in non-side directions, such as longitudinal (e.g., forward/reward) impacts (accelerations) and/or vertical impacts (accelerations). For example, if a forward impact produces a longitudinal acceleration greater than a threshold to engage an airbag, for example, even though the airbag is deployed in response thereto no action is taken with respect to disconnecting fuel system components because a lateral force/acceleration component of the impact is below a non-zero threshold for triggering fuel system disconnection. Alternatively, if a forward impact produces a longitudinal acceleration greater than the threshold to engage an airbag and also has a lateral force/acceleration component above the non-zero threshold for triggering fuel system disconnection, the both the air bag is deployment and the fuel system disconnection can be executed. Still further, if an impact has a longitudinal acceleration less than the threshold to engage an airbag and also has a lateral force/acceleration component above the non-zero threshold for triggering fuel system disconnection, then the airbag is not deployed yet the fuel system disconnection is executed.

FIGS. 2-6 show various embodiments of a vehicle system, such as vehicle system 100 shown in FIG. 1. The embodiments of FIGS. 2-6 may include similar components to one another and to the system shown in FIG. 1. As such, similar components have been numbered similarly. Further, the systems of FIGS. 2-6 may include additional components of FIG. 1 that are not shown in FIGS. 2-6. FIGS. 2-4 shows a first embodiment of a vehicle system 200 that includes fuel system 218 including a fuel tank 202 (which may be similar to fuel tank 20 shown in FIG. 1) with a fuel tank extension pipe 220 coupled between fuel tank 200 and fuel pipe 240. As such, in this first embodiment, a nozzle 219 of fuel pipe 240 is detachably coupled to the fuel tank extension pipe 220. FIGS. 5-6 shows a second embodiment of a vehicle system 500 that includes a fuel system (which may have similar components to and operate similarly to fuel system 18 described above with reference to FIG. 1) with a fuel tank 520 having an inlet port 26 integral with a side of fuel tank 520. In the second embodiment, a nozzle 19 of fuel pipe 24 is detachably coupled to inlet port 26 of fuel tank 520. As shown in FIGS. 2-6, arrow 98 is provided to indicate a vertical direction common in each of FIGS. 2-6. Specifically, arrow 98 represents a direction that is normal to a ground upon which a vehicle system including the fuel pipe may be resting. Accordingly, a first component of one of FIGS. 2-6 depicted is "above" a second component if it occupies a position of greater vertical magnitude. In other words, a first component is above a second component if its position is further along the direction of arrow 98. Similarly, a first component is below a second component if it occupies a position of lesser vertical magnitude. Furthermore, a horizontal direction by definition includes any direction perpendicular to arrow 98.

Turning first to FIG. 2, a partial side view of the vehicle system 200, including an exterior side 106 and several components of fuel system 218, is shown. As shown in FIG. 2, side fueling port 28 (via which a user may re-fill fuel tank 202 with fuel) fluidly couples fuel tank 202 to the atmosphere via a cutout in the side of the external body of vehicle system 200 when the nozzle 219 of fuel pipe 240 is engaged with an inlet port 260 of fuel tank extension pipe 220. Thus, side fueling port 28 is coupled to fuel tank 202 via fuel pipe 240, inlet port 260, and fuel tank extension pipe 220. A first end (e.g., downstream end) 221 of fuel tank extension pipe 220 is directly coupled to fuel tank 202 (e.g., directly coupled to a side surface of fuel tank 202), while a second end (e.g., upstream end) 223 of the fuel tank extension pipe 220 extends toward the side fueling port 28. The second end 223 of the fuel tank extension pipe 220 includes the inlet port 260. Thus, when the nozzle 219 of fuel pipe 240 is engaged with inlet port 260, fuel tank extension pipe fluidly couples fuel pipe 240 to fuel tank 202.

With reference to the flow of fuel through the vehicle system when the nozzle 219 of fuel pipe 240 is engaged with inlet port 260, it will be understood that the upstream end of the fueling system is side fueling port 28, designated as such because it is the location where new fuel is introduced to the system. Similarly, the engine of vehicle system 200 (not shown) is the downstream end of the fueling system. However, with reference only to the vehicle components depicted at FIG. 2, the downstream end of the fueling system is fuel tank 202, as it is the component most proximate to the engine in terms of the direction of fuel flow through the vehicle system 200. The relative upstream and downstream positioning of each component remains unchanged across the detachable fuel pipe embodiments. Thus, the sequential order of (from furthest upstream to furthest downstream) depicted components is as follows: side fueling port 28, second end 231 of fuel pipe 240, first end 227 of fuel pipe 240 (including the nozzle 219), inlet port 260, fuel tank extension pipe 220, and fuel tank 202. Additionally, it will be understood that an upstream portion of a component refers to a portion of the component that is more proximate to side fueling port 28 with respect to the direction of flowing fuel, whereas a downstream portion is less proximate to side fueling port 28 with respect to the direction of flowing fuel.

A shroud 234 may be included near the location of physical coupling between fuel pipe 240 and inlet port 260. As one example, shroud 234 may be attached to the nozzle 219 of the fuel pipe 240, and its motion may follow that of the nozzle 219 when moving between the engaged position and the disengaged position. As another example, shroud 234 may be attached around the inlet port 260, and its position may not change with the position of the nozzle 219. Still other configurations of shroud 234 at the point of physical coupling may be implemented while maintaining the advantage of reducing dirt accumulation at the point of physical coupling between the fuel pipe 240 and the inlet port (e.g., fuel tank inlet). Shroud 234 may be manufactured from plastic, rubber, or any other suitable material.

As shown in FIG. 2, the fuel tank extension pipe 220 is supported by bracket 222. Bracket 222 may be mounted to vehicle system 200 at a location along a body of the vehicle system 200 and/or to another stationary component within the body of vehicle system 200. Bracket 222 may attach to fuel tank extension pipe 220 at a position between the fuel tank 202 and the inlet port 260. Bracket 222 may be constructed from one of plastic or metal. By providing bracket 222 to support the weight of fuel tank extension pipe 220, degradation via stress of the coupling between the fuel tank extension pipe 220 and the fuel tank 202 may be reduced. By reducing degradation of this coupling, fuel leaks at this interface may be reduced. Additionally, by reducing the relative motion between the inlet port 260 and the nozzle 219 of the fuel pipe 240, control of the nozzle position via an actuator (such as actuator 88 shown in FIG. 1) may be more reliable.

As shown in FIG. 2, fuel pipe 240 is supported by bracket 224. Bracket 224 may be mounted to vehicle system 200 at a location along a surface of a body of the vehicle, for example, and secured to fuel pipe 240 at a point upstream of and vertically above the first end 227. Bracket 224 may be constructed from one of plastic or metal. Thus the load applied to inlet port 260 via the nozzle 219 of fuel pipe 240 may be reduced. In this way, the durability of the seal between the nozzle 219 of fuel pipe 240 and inlet port 260 of fuel tank extension pipe 220 may be improved. By reducing degradation, fuel leaks at this interface may be reduced. It should be noted that in the embodiment of FIGS. 5-6, as described below, a bracket the same or similar to bracket 224 may be used to support the fuel pipe shown in FIGS. 5-6.

FIG. 3 shows further detail of the embodiment of the inlet port 26 of fuel tank extension pipe 220 shown in FIG. 2. As shown in FIG. 3, inlet port 260 is located at the upstream end 223 of fuel tank extension pipe 220, and the downstream end 221 of the fuel tank extension pipe 220 is directly coupled to an opening in the fuel tank 202.

In one example, the coupling between fuel tank extension pipe 220 and fuel tank 202 may be at a position above a maximum fill line of fuel tank 202, thereby preventing inadvertent flow of fuel from the fuel tank through the fuel tank extension pipe upstream toward a side fueling port (e.g., 28 at FIG. 2). As described above, the upstream end 223 of fuel tank extension pipe 220 includes inlet port 260. The fuel tank extension pipe 220 extends in an upward direction from fuel tank 202 toward the side fueling port 28 (shown in FIG. 2). In this way, fuel tank extension pipe 220 provides a more accessible inlet port as compared to an inlet port integral to the fuel tank body. Additionally, the upward extension and vertical arrangement of the upstream end 223 further reduces the chance of liquid fuel spilling from the fuel tank through inlet port 260. As another example, by providing an upward extension and vertical arrangement of the upstream end 223, fuel leakage may be reduced during conditions where horizontal forces are imparted onto the fuel tank 202, such as during vehicle acceleration and braking.

Inlet port 260 is a self-sealing port. Specifically, inlet port 260 is configured to establish a fluidic sealing of the fuel tank 202 without the use of a removable cap. As one example of a self-sealing port, inlet port 260 includes a movable tab 262 with a cross sectional area (e.g., frontal area) equivalent to that of an internal cross-sectional area of the fuel tank extension pipe 220. In one example, the movable tab 262 may be constructed from metal. As such, the movable tab 262 of the inlet port 260 is adapted to cover and seal an opening of the second end 223 of the fuel tank extension pipe 220. Additionally, the movable tab 262 may be mounted on a torsional spring-loaded hinging mechanism. The movable tab 262 may herein also be referred to a flap. When not engaged by the fuel pipe 240 (e.g., as depicted at FIG. 3), the hinging mechanism biases the movable tab 262 to a first position that is flush with a lip at the opening of the upstream end 223 of the fuel tank extension pipe 220, thereby completely covering the opening at the upstream end 223 of the extension pipe 220. As such, little to no fuel may escape the fuel tank 202 via the opening in the fuel tank extension pipe 220 when the movable tab 262 is in the first position. For this reason, the first position may herein also be referred to as a disengaged position of the movable tab. When engaged by the fuel pipe (e.g., when the fuel pipe is coupled to the fuel tank extension pipe 220), the movable tab 262 is pushed inward toward a second position, herein also referred to as an engaged position of the movable tab. The second position is inward toward the fuel tank, and allows for the flow of fuel through the inlet port 260. As one example, the second position partially exposes the opening at the upstream end 223 of the fuel tank extension pipe 220. As another example, the second position fully exposes the opening at the upstream end 223 of the fuel extension pipe 220. In this way, a fluidic sealing of the fuel tank 202 may be established when the inlet port 260 is not engaged by the fuel pipe, and a fluidic communication between the fuel tank and the fuel pipe may be established when the inlet port is engaged by the fuel pipe. Put another way, fuel may be blocked from exiting the fuel tank 202 when the movable tab 262 is in the disengaged position, and fuel may be allowed to flow into or out of the fuel tank when the movable tab is in the engaged position. It will be appreciated that a still further example of a self-sealing port may be used without departing from the scope of the present invention.

By providing a means to physically decouple the fuel pipe 240 from fuel tank 202 while simultaneously sealing fuel tank 202 at the point of coupling, fuel vapor escaping into atmosphere may be reduced. In this way, fuel tank leakage and/or spillage via a ruptured fuel pipe may be reduced.

Turning now to FIGS. 4A and 4B, the first embodiment of the detachable fuel pipe shown in FIGS. 2-3 is shown with the fuel pipe nozzle 219 in an engaged position and a disengaged position with the fuel tank extension pipe, respectively. As described above, the first end 227 of fuel pipe 240 includes the nozzle 219 for selectively engaging the inlet port 260 located at the upstream end 223 of fuel tank extension pipe 220. In one example, the nozzle 219 of the fuel pipe is a movable and active nozzle. It will be understood that the term "movable and active nozzle" refers to a nozzle capable of changing positions via actuation by an actuator controlled by a controller (such as controller 12 shown in FIG. 1) while the remainder portion of the fuel pipe remains stationary (e.g., the remainder upstream portion held in place by bracket 224, as shown in FIG. 2). The position of the nozzle 219 may be adjusted via an actuator 88 that is physically coupled to the first end 227 of the fuel pipe 240, and in some examples to nozzle 219 itself. As another example, fuel pipe 240 may include a non-active nozzle that is not movable relative to the rest of the fuel pipe 240, and actuator 88 may be configured to translate the entirety of the fuel pipe 240 across a specified distance to adjust the position of the nozzle between an engaged position and a disengaged position with the inlet port 260.

Referring now to the engaged mode of FIG. 4A, the first end 227 of the fuel pipe is shown engaging inlet port 260. As an example, the fuel pipe nozzle 219 may engage the inlet port 260 during engine operation. In the engaged position, the nozzle is seated within inlet port 260. Specifically, the nozzle 219 may extend into inlet port 260 and into an interior of the fuel tank extension pipe 220 by a distance, thereby establishing a physical coupling between the fuel pipe 240 and fuel tank extension pipe 220. Thus, when the nozzle 219 is in an engaged position, fuel tank 202 is physically and fluidically coupled to the side fueling port of the fuel system. As described above with reference to FIG. 2, the shroud 234 may be provided at the nozzle 219 to reduce accumulation of dirt at the inlet port 260.

In the event of an impact event over a threshold magnitude (e.g., a collision), actuator 88 may be controlled via a controller (such as controller 12 shown in FIG. 1) to retract the nozzle 219 at the first end 227 of the fuel pipe 240 out of and away from inlet port 260. Specifically, the actuator 88 may adjust the nozzle position from a first position to a second position, where the first nozzle position is within the inlet port 260 and engaged with an internal surface of the fuel tank extension pipe 220, and the second position is outside of and not in contact with the inlet port 260. The first nozzle position may be the engaged position described above, wherein the nozzle 219 penetrates the inlet port 260 by a predetermined distance. The second position may be a disengaged position that is located a predetermined separation amount away from the inlet port, as indicated by the gap between first end 227 of the fuel pipe 240 and inlet port 260 at FIG. 4B. Thus, moving the nozzle 219 into the disengaged position may include moving the nozzle 219 away from the inlet port 260 by a distance greater than the predetermined distance in which the nozzle 219 penetrates the inlet port when in the engaged position. It will be understood that the direction of motion of the nozzle is the axial direction of the nozzle, which is preferably aligned along a central axis of the nozzle and with the surface normal of the opening at the upstream end 223 of the fuel extension pipe 220. Once the nozzle 219 is removed (e.g., detached) from the inlet port, the self-sealing mechanism may engage the movable flap 262 of the inlet port to a position covering the opening of the fuel tank extension pipe, thereby sealing the fuel tank extension pipe 220. In this way, the physical and fluidic coupling between the fuel tank and the fuel pipe may be removed during an impact event when a breach in the vehicle fuel system may be present upstream of the fuel tank. Additionally, by reducing the distance between the first and second nozzle positions to a distance that just spaces the nozzle away from the inlet port, actuation time between the engaged state and the disengaged state may be reduced.

In the example where actuator 88 is a solenoid, the nozzle 219 may be controlled in the engaged position (e.g., engaged with the fuel tank extension pipe) when the solenoid is in an energized mode, and may be controlled to be in the disengaged position (e.g., disengaged with the fuel tank extension pipe) when the solenoid is in a deenergized mode. Thus, the solenoid may adjust the position of the nozzle 219 from the engaged position to the disengaged position upon a controller de-energizing the solenoid (e.g., switching from an energized mode to a de-energized mode). In this way, if electronic communication with the solenoid is lost upon impact, the nozzle position may default to the disengaged position.

In this way, the fuel pipe may be quickly detached from the fuel tank. By providing a self-sealing inlet port, the fuel tank may automatically be sealed at the point of coupling between the fuel pipe and the fuel tank when the fuel pipe disengages from the inlet port. Providing an automatic seal may reduce the amount of time that fuel vapor is able to exit the fuel tank. By reducing the amount of time between an impact event and the decoupling of the fuel tank and the fuel side port, the amount of leaked and/or spilled fuel may be reduced.

Turning now to FIGS. 5-6, the second embodiment of a vehicle system 500 with a fuel tank 520 having an inlet port 26 integral with a side of fuel tank 520 is shown. The vehicle system 500 may include a fuel system similar to the fuel system 18 shown in FIG. 1. Further, the vehicle system 500 may operate similarly to and have similar components to those of the vehicle system 200 shown in FIGS. 2-4. However, instead of including a fuel tank extension pipe, as shown in FIGS. 2-4, the fuel tank 520 includes the inlet port 26 formed integrally with the fuel tank 520. As such, the nozzle 19 of fuel pipe 24 (shown in FIGS. 6A-6B) is detachably coupled to inlet port 26 of fuel tank 520. Thus, the fuel tank 520 of vehicle system 500 is configured to engage the nozzle 19 of the fuel pipe 24 directly, rather than via the fuel tank extension pipe of the embodiment shown in FIGS. 2-4.

As shown in FIG. 5, fuel tank inlet port 26 is integrated into the housing of fuel tank 520. Specifically, fuel tank inlet port 26 is provided at an opening on a side wall of the housing of fuel tank 520. Thus, in the second embodiment of the detachable fuel pipe, the coupling of the side fueling port to the fuel tank is via two intermediary components: the fuel pipe and the fuel tank inlet port.

Fuel tank inlet port 26 may be one of the self-sealing ports described above with reference to FIG. 3, and as such may include a movable tab 262 mounted on a torsional spring-loaded hinging mechanism configured as previously described. Thus, the movable tab 262 of the fuel tank inlet port 26 is movable between a first position covering the opening of the inlet port 26 (and thus an opening of the fuel tank 520) and a second position that is moved away from the opening to allow fluid flow between the fuel tank 520 and the attached fuel pipe 24. The engaging of the nozzle with the fuel tank inlet port 26 is described in further detail below with reference to FIGS. 6A and 6B.

As one example, fuel tank 520 may be supported via a vehicle frame 510. For example, a plurality of brackets (not shown) may couple the top face of fuel tank 520 to a bottom face of vehicle frame 510. In this way, if a fuel pipe is also mounted to the vehicle frame (e.g., via a bracket, such as bracket 224 shown at FIG. 2), the relative motion between the fuel pipe and the fuel tank 520 may be reduced. A reduced amount of relative motion between the fuel pipe and fuel tank 520 may improve the fluidic and physical coupling of the two components. Furthermore, degradation of the seal may be reduced during conditions in which fuel tank inlet port 26 is engaged by the fuel pipe due to a reduced load associated with fuel tank 520.

By configuring the fuel tank to engage the nozzle of the fuel pipe directly, packing space of the detachable fuel pipe may be reduced. Additionally, the number of components and fluid connections of the fuel system may be reduced, thereby reducing system maintenance (e.g., as compared to a fuel tank including a fuel tank extension pipe such as fuel tank 202 at FIG. 2).

FIGS. 6A and 6B show the second embodiment of the detachable fuel pipe of FIG. 5 with the nozzle 19 in an engaged position and a disengaged position with the fuel tank 520, respectively.

The first end 27 of fuel pipe 24 includes a nozzle 19 for selectively engaging fuel tank inlet port 26 located on the housing of fuel tank 20. Thus fuel pipe 24 may be directly coupled to fuel tank 20, without any additional components positioned therebetween, when the nozzle 19 engages fuel tank inlet port 26. In one example, the nozzle 19 of the fuel pipe is a movable and active nozzle, as described above with reference to FIGS. 4A and 4B. For example, the nozzle 19 may move relative to a remaining portion of the fuel pipe 24 via actuator 88. As another example, fuel pipe 24 may include a non-active nozzle that is not movable relative to the remaining portion of the fuel pipe 24, and actuator 88 may be configured to translate the entirety of the fuel pipe 24, also as described above. The position of the nozzle 19 may be controlled via actuator 88. In the illustrated example, actuator 88 is mounted to the fuel tank 520. However, in other examples, actuator 88 may be mounted elsewhere, such as to the vehicle frame at a location proximate to the first end 27 of the fuel pipe, or directly to the first end of the fuel pipe. Actuator 88, which is in electronic communication with a controller (such as controller 12 of FIG. 1), is configured to control the motion of the nozzle along the axial direction of the nozzle. Said another way, the actuator 88 controls translational movement of the nozzle 19 along an axis through a centerline of the nozzle.

Referring now to the engaged mode shown at FIG. 6A, the first end 27 of the fuel pipe is shown engaging fuel tank inlet port 26. As an example of an engaged mode, the fuel pipe nozzle 19 may engage the fuel tank inlet port during engine operation. In the engaged position, the nozzle 19 is seated within fuel tank inlet port 26 and seals against an interior surface of the fuel tank inlet port 26 and opening of the fuel tank 520. Specifically, the nozzle 19 may extend into fuel tank inlet port 26 by a threshold distance, thereby establishing a physical coupling between the fuel pipe 24 and fuel tank 520. Thus, when the nozzle is in an engaged position, fuel tank 520 is physically and fluidically coupled to the side fueling port of the fuel system. As described above with reference to FIG. 2, a shroud 234 may be provided at the nozzle 19 to reduce accumulation of dirt at the fuel tank inlet port 26.

In the event of an impact event over a threshold impact magnitude (e.g., a collision), actuator 88 may be controlled via an electronic controller to retract the nozzle 19 at the first end 27 of the fuel pipe 24 out of and away from fuel tank inlet port 26. Specifically, the actuator may adjust the nozzle position from a first position to a second position, where the first nozzle position is partially within and engaged with (e.g., coupled to) the fuel tank inlet port 26, and the second position is outside of the fuel tank inlet port. The first nozzle position may be the engaged position described above, wherein the nozzle 19 penetrates the fueling port by a predetermined amount of penetration. The second position may be a disengaged position that is located a predetermined separation amount away from the fuel tank inlet port 26, as indicated by the gap between first end 27 of the fuel pipe 24 and fuel tank inlet port 26 at FIG. 6B. Said another way, in the second position, the nozzle 19 is spaced a distance away from the fuel tank inlet port 26 and the fuel tank 520. Thus moving the nozzle from the engaged position to the disengaged position may include moving the nozzle 19 away from the fuel tank inlet port 26 by a distance greater than the predetermined amount of penetration when the nozzle is engaged with the fuel tank inlet port. It will be understood that the direction of motion is the axial direction of the nozzle, which is preferably aligned perpendicular to the surface normal of the opening at the fuel tank 520. Once removed from the fuel tank inlet port 26, the self-sealing mechanism may engage the movable flap of the inlet port to a disengaged position, thereby sealing the fuel tank 520 such that little to no fuel may escape the fuel tank 520 through the fuel tank inlet port 26. In this way, the physical and fluidic coupling of the fuel tank and a side fueling port may be removed when a breach in the vehicle fuel system may be present therebetween.

In one example, actuator 88 is a solenoid. As described above with reference to FIGS. 4A and 4B, the engaged nozzle position may correspond to an energized mode of the solenoid, and the disengaged nozzle position may correspond to a deenergized mode of the solenoid. In this way, if electronic communication with the solenoid is lost upon impact, the nozzle 19 may default to a disengaged position. In this way, the retracting nozzle may be retracted out of and away from the fuel tank inlet port in response to an impact, even if actuator 88 becomes disconnected to the controller due to the impact.

Figure 7:
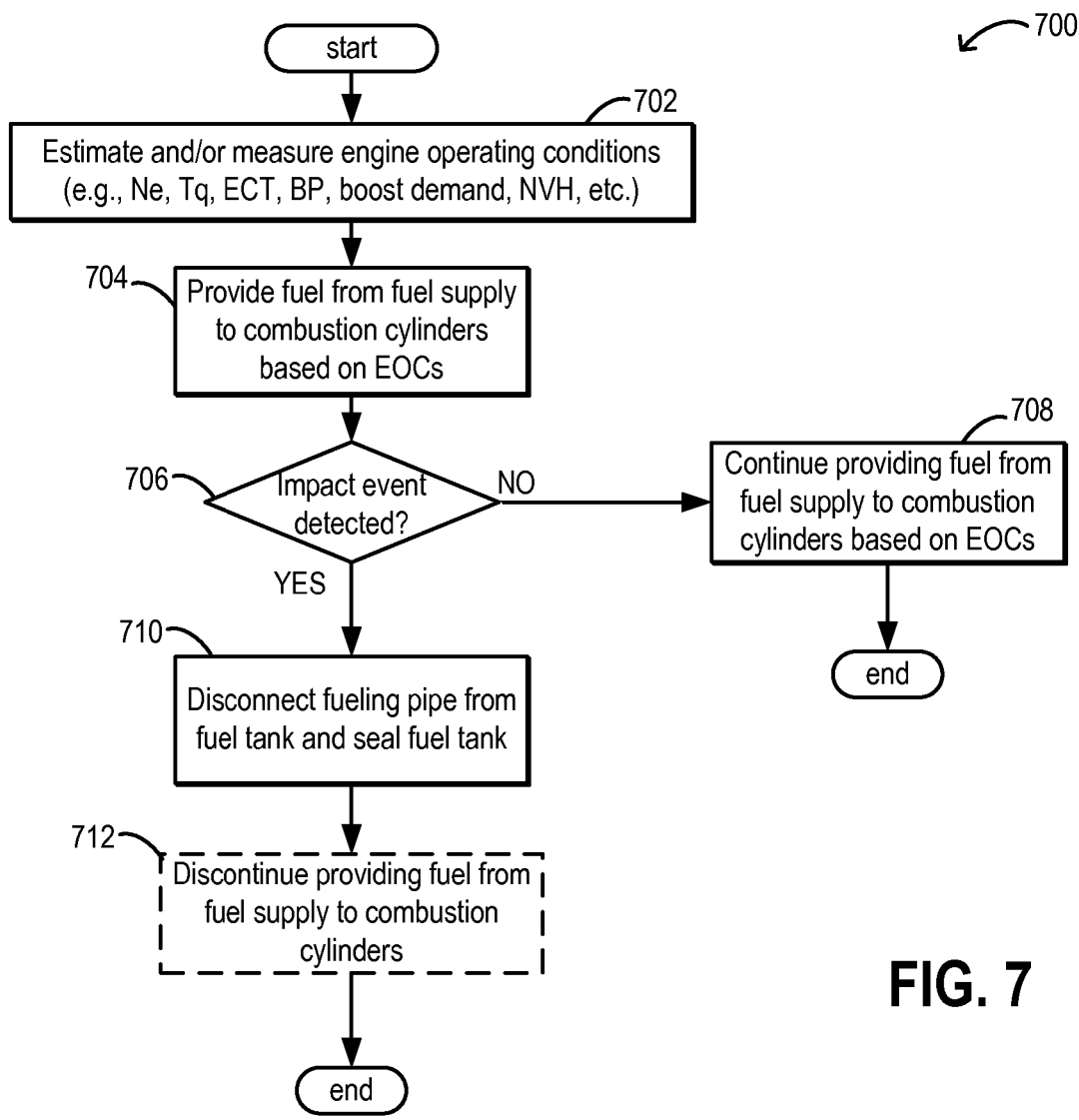
FIG. 7 depicts a controller-executable routine for disengaging a detachable fuel pipe of a vehicle fueling system in response to a detected impact event.

FIG. 7 provides a routine 700 for operating a vehicle fuel system of a vehicle system (such as vehicle systems 100, 200, or 500 of FIGS. 1-6) and, in response to a detected impact event, disengaging a fuel pipe nozzle from a fuel tank. Instructions for carrying out routine 700 by a controller (such as controller 12 shown in FIG. 1) based on instructions stored on a memory of the controller and in conjunction with signals received from sensors of the vehicle system, such as the sensors described above with reference to FIG. 1. The controller may employ engine actuators of the vehicle fuel system to adjust vehicle fuel system operation, according to the routine described below.

Routine 700 includes, at 702, estimating and/or measuring vehicle and engine operating conditions. These may include, for example, engine speed, engine temperature, ambient conditions (ambient temperature, pressure, humidity, etc.), torque demand, manifold pressure, manifold air flow, canister load, exhaust catalyst conditions, oil temperature, oil pressure, soak time, a position of a fuel pipe of the fuel system, etc. Estimating and/or measuring vehicle and engine operating conditions may include receiving signals from a plurality of sensors, such as sensors 16 at FIG. 1, and processing these signals in an appropriate manner.

Continuing to 704, fuel is provided from a fuel supply of the vehicle fueling system to combustion cylinders of the engine based on the engine operating conditions. For example, with reference to FIG. 1, a fuel pump, such as fuel pump 21 shown in FIG. 1, may be configured to pump a desired amount of fuel from a fuel tank, such as fuel tank 20, to an engine. The engine may further distribute the pumped fuel to one or more combustion cylinders based on engine operating conditions. The desired amount of fuel is determined based on the engine operating conditions that were measured and/or estimated at 702. In other embodiments, the fuel supply may be one of fuel tank 20, fuel tank 202, or fuel tank 520 shown in FIGS. 1, 2, and 5, respectively.

At 706, it is determined whether an impact event has occurred. Specifically, signals from an impact sensor (e.g., impact sensor 96 at FIG. 1) may be processed to determine whether a vehicle impact event has occurred that is at or above a threshold impact level. Determining whether such an impact has occurred may comprise the controller receiving a signal from the impact signal and determining whether the received signal is above a threshold.

In one example, determining whether an impact event has occurred at 706 includes determining whether a side impact event has occurred. That is to say, the routine at 706 may include determining whether the impact with a foreign body occurred along an exterior side wall of the car (e.g., one of first and second side walls 106 and 108 at FIG. 1). Determining the location of the impact may include comparing signals from a plurality of impact sensors distributed across the vehicle. However, it will be appreciated that the advantages achieved by routine 700 are not specific to a side impact, and may be achieved during any sort of vehicle impact.

If an impact event is detected at 706, routine 700 proceeds to 710 where a nozzle of a fuel pipe is fluidly and physically uncoupled from the fuel tank (e.g., fuel supply) in response to the detected impact event. The fuel pipe is a fuel passage coupled between a vehicle fueling (e.g., re-filling) port (e.g., side fueling port 28 shown in FIGS. 1 and 2) and the fuel tank (for example, one of fuel pipes 24 or 240 shown in FIGS. 1-2, 4A-4B, and 6A-6B). For example, with reference to vehicle fuel system 18 at FIG. 1, nozzle 19 may be fluidly and physically uncoupled from fuel tank 20 via actuator 88. As described above, nozzle 19 is arranged at a first end 27 of the fuel pipe, and a second end 31 of the fuel pipe is coupled to a side fueling port 28 of vehicle 100.

As one example, uncoupling the nozzle of the fuel pipe includes actuating an actuator (such as actuator 88 shown in FIGS. 1, 4A-4B, and 6A-6B) coupled with the nozzle to retract the nozzle out of and away from an opening in a fuel tank extension pipe directly coupled to an opening of the fuel tank. As another example, uncoupling the nozzle of the fuel pipe includes actuating an actuator coupled with the nozzle to retract the nozzle out of and away from an opening in the fuel tank.

As described above with reference to FIGS. 4A, 4B, 6A and 6B, uncoupling the nozzle of the fuel pipe from the fuel tank further includes the moving of the self-sealing fuel tank inlet port from an engaged position to a disengaged position. In the example of the movable tab described above, this includes moving a tab from an open position to a closed position that covers the opening of the fuel tank and blocks fuel from exiting the tank. It will be noted that in this example, the moving of the tab is a passive action and not an action executed by a controller (e.g., controller 12 at FIG. 1).

After fluidly and physically uncoupling the nozzle of the fuel pipe from the fuel tank, further measures to reduce fuel leakage may be executed at 712. Specifically, the controller may discontinue providing fuel from the fuel supply to the combustion cylinders. As one example, the controller may actuate a valve (e.g., closing valve 29 at FIG. 1). As another example, the controller may discontinue operating the fuel pump to prevent fuel from being delivered to the engine in response to an impact event. The further leakage reducing measures at 712 may be executed during any example impact event, and not just during side impact events or front impact events. After 712, routine 700 terminates.

Returning to 706, if an impact event is not detected, routine 700 proceeds to 708. At 708, the controller continues to provide fuel from the fuel supply to the combustion cylinders of the engine, as described at 704. Further, the routine at 708 includes maintaining the fluidic and physical coupling between the fuel pipe and the fuel tank and not disconnecting the fuel pip from the fuel tank. After 708, routine 700 terminates.

In this way, in response to a detected impact event of a vehicle (e.g., such as a collision), a fuel pipe connecting a vehicle fueling port to a fuel tank of a fuel system of the vehicle may be decoupled from the fuel tank, and the fuel tank may be sealed from atmosphere. By sealing the fuel tank from the fuel pipe and the surrounding environment, fuel may be prevented from spilling or leaking through a ruptured fuel pipe. By sealing the fueling inlet of the fuel tank in addition to discontinuing supply of fuel to the engine, fuel leakage may be reduced across a larger range of impact scenarios.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
   a side fueling port fluidly and physically coupled to a fuel tank via a fuel pipe including a detachable nozzle;
   an actuator coupled to the nozzle;
   an impact sensor; and
   a controller with computer-readable instructions stored thereon for:
   disengaging the nozzle from the fuel tank via the actuator in response to receiving a signal from the impact sensor indicating a vehicle side impact.

2. The system of claim 1, wherein disengaging the nozzle from the fuel tank includes actuating the actuator coupled to the nozzle to detach the nozzle and the fuel pipe coupled to the nozzle from the fuel tank only in response to receiving the signal indicating the vehicle side impact, and not in response to indications of impacts in non-side directions.

3. The system of claim 2, wherein the actuator includes a solenoid.

4. The system of claim 1, wherein the nozzle is adapted to be engaged with an opening of the fuel tank and wherein the fuel pipe is coupled between the nozzle and the side fueling port.

5. The system of claim 4, wherein disengaging the nozzle from the fuel tank includes actuating the actuator coupled to the nozzle to retract the nozzle out of and away from the opening of the fuel tank.

6. The system of claim 4, wherein the opening is an opening in an exterior housing of the fuel tank and includes a cap less fueling port including a tab movable between a first position where the tab covers the opening and a second position where the tab is pushed inward into the fuel tank and away from the opening.

7. The system of claim 6, wherein when the nozzle is engaged with the opening, the cap less fueling port is in the second position and when the nozzle is disengaged with the opening, the cap less fueling port is in the first position.

8. The system of claim 1, wherein the nozzle is adapted to be engaged with a first end of a fuel tank extension pipe, where a second end of the fuel tank extension pipe is directly coupled to the fuel tank, the fuel tank extension pipe extending away from the fuel tank and toward the side fueling port, and wherein the first end of the fuel tank extension pipe includes a cap less fueling port including a movable tab.

9. The system of claim 8, wherein disengaging the nozzle from the fuel tank includes actuating the actuator coupled to the nozzle to retract the nozzle out of and away from the first end of the fuel tank extension pipe.

10. The system of claim 8, wherein when the nozzle is engaged with the first end of the fuel tank extension pipe the tab is pushed inward into the fuel extension pipe and when the nozzle is disengaged with the first end of the fuel tank extension pipe the tab covers an opening of the first end of the fuel tank extension pipe.

11. A method for a vehicle fueling system, comprising:
   in response to a detected vehicle side impact event, fluidly and physically uncoupling a nozzle of a fuel pipe from a fuel tank via an actuator coupled with the nozzle, where the nozzle is arranged at a first end of the fuel pipe and a second end of the fuel pipe is coupled to a side fueling port of a vehicle.

12. The method of claim 11, wherein uncoupling the nozzle of the fuel pipe includes actuating the actuator coupled with the nozzle to retract the nozzle out of and away from an opening in the fuel tank.

13. The method of claim 12, further comprising, upon uncoupling the nozzle of the fuel pipe from the fuel tank, moving a tab of a cap less fueling port of the fuel tank over the opening to block fuel from exiting the fuel tank.

14. The method of claim 11, wherein uncoupling the nozzle of the fuel pipe includes actuating the actuator coupled with the nozzle to retract the nozzle out of and away from an opening in a fuel tank extension pipe directly coupled to an opening of the fuel tank.

15. The method of claim 14, further comprising, upon uncoupling the nozzle of the fuel pipe from the fuel tank, moving a tab of a cap less fueling port of the fuel tank extension pipe over the opening to block fuel from exiting the fuel tank extension pipe.

16. An engine system of a vehicle, comprising:
an engine fueling system including a fuel tank;
a fueling port coupled to a side exterior of the vehicle;
a fuel pipe with a first end coupled to the side fueling port and a second end coupled to the fuel tank, where the second end includes a detachable nozzle;
an impact sensor; and
a controller with computer readable instructions for:
disengaging the nozzle of the fuel pipe from the fuel tank via an actuator coupled with the nozzle in response to a signal from the impact sensor indicating a side impact of the vehicle, where disengaging the nozzle from the fuel tank includes physically and fluidly decoupling the fuel pipe from the fuel tank.

17. The engine system of claim 16, wherein when the nozzle is engaged with the fuel tank, the nozzle is directly coupled to an inlet port in a surface of the fuel tank.

18. The engine system of claim 16, further comprising a fuel tank extension pipe coupled between the fuel tank and the fuel pipe, where a second end of the fuel tank extension pipe is directly coupled to the fuel tank, and wherein when the nozzle is engaged with the fuel tank the nozzle is directly coupled to an inlet port in a first end of the fuel tank extension pipe.

19. The engine system of claim 16, wherein the engine fueling system further comprises a fuel pump fluidly coupled to the fuel tank at an alternate location than the fuel pipe.

20. The engine system of claim 16, further comprising the actuator in electronic communication with the controller and physically coupled to the nozzle and wherein disengaging the nozzle of the fuel pipe from the fuel tank includes actuating the actuator to translate the nozzle in an axial direction away from and out of fluidic engagement with the fuel tank.

* * * * *